(12) United States Patent
Abo-Namous et al.

(10) Patent No.: US 11,092,428 B2
(45) Date of Patent: Aug. 17, 2021

(54) DEVICE AND METHOD FOR MEASURING OBJECTS

(71) Applicant: GOM GmbH, Braunschweig (DE)

(72) Inventors: Omar Abo-Namous, Salzgitter (DE); Jan Thesing, Braunschweig (DE); Alexander Zimmermann, Braunschweig (DE); Witalij Wambold, Braunschweig (DE)

(73) Assignee: GOM GmbH, Braunschweig (DE)

( * ) Notice: Subject to any disclaimer, the term of this patent is extended or adjusted under 35 U.S.C. 154(b) by 0 days.

(21) Appl. No.: 16/697,120

(22) Filed: Nov. 26, 2019

(65) Prior Publication Data

US 2020/0166329 A1 May 28, 2020

(30) Foreign Application Priority Data

Nov. 26, 2018 (DE) .................... 10 2018 129 766.1

(51) Int. Cl.
*G01B 11/00* (2006.01)
*G01B 11/26* (2006.01)
*G06T 17/00* (2006.01)

(52) U.S. Cl.
CPC ............ *G01B 11/002* (2013.01); *G01B 11/26* (2013.01); *G06T 17/00* (2013.01)

(58) Field of Classification Search
CPC .. G01B 11/002; G01B 11/26; G01B 2210/62; G01B 5/0004; G01B 5/0016; G06T 17/00
See application file for complete search history.

(56) References Cited

U.S. PATENT DOCUMENTS

2019/0033065 A1\* 1/2019 Tsukamoto ............... G06T 7/55

\* cited by examiner

*Primary Examiner* — Tri T Ton
(74) *Attorney, Agent, or Firm* — Falk Ewers; Ewers IP Law PLLC

(57) ABSTRACT

A device for receiving an object for three-dimensional measurement includes at least one bearing point for bearing the object, the at least one bearing point being configured to limit the object movement in at least one degree of freedom of the object and the entirety of all used bearing points being configured to limit the object movement in exactly all degrees of freedom of the object.

7 Claims, 7 Drawing Sheets

DEVICE AND METHOD FOR MEASURING OBJECTS

CROSS REFERENCE TO RELATED APPLICATIONS

This application claims priority to German patent application DE 10 2018 129 766.1, filed Nov. 26, 2018, the entire content of which is incorporated herein by reference.

TECHNICAL FIELD

The disclosure relates to a device for receiving an object, to measure the object by tactile or optical measuring methods, as well as to a method for determining a state without tension of the object with the device.

BACKGROUND

The acquisition of the three-dimensional (3D) geometry of objects is a typical measurement task that is used in numerous industries, for example for components such as sheet metal, tools or injection molded parts.

Topometric measurement is a well-known measurement method for generating 3D measurement data describing the surface of a measurement object. For this purpose, the object to be measured is illuminated by a projector with a pattern, in particular a striped pattern, the projected pattern is recorded with one or more image acquisition units and then evaluated by an evaluation unit.

In the course of quality control, the 3D measurement data are frequently compared with the target geometry, for example a computer-aided design (CAD) model of the component, in order to detect deviations of the real component (actual geometry) from the target geometry and to sort out components with deviations greater than a defined tolerance before further processing.

In the case of inherently rigid components, the compliance with the component geometry can usually be checked by 3D measurement of the component. In the case of non-inherently rigid components, such as sheet metal or plastic parts, the inspection of the component is much more difficult, since the component deforms slightly and a 3D measurement delivers a different result after the component has been held during the measurement. Under certain circumstances, the component does not take its final shape until it has been assembled. It can therefore happen that deviations from the target geometry are determined which lie above a tolerance limit, although this deviation does not pose a problem for the quality of the products, as long as defined functional dimensions such as distances or diameters of assembly holes or connecting pins are maintained.

Non-inherently rigid components can therefore be clamped in clamping fixtures before the measurement to simulate the assembled condition. The fixture receive the component at predefined holding points/clamping points. The component is physically clamped against the fixture at the clamping points. The subsequent installation situation of the component is simulated by the clamping process so that functional dimensions can be checked. Since these clamping devices must be specially adapted to the installation situation and the special component, this procedure is complex and cost-intensive.

Another possibility is to deform the measurement data of a component that is not inherently rigid with computer support in such a way that a clamped condition of the component, for example the subsequent installation situation, is simulated from the measurement data of the component that is not clamped. For the assessment of the component, for example in quality assurance, the originally determined 3D measurement data is no longer used, but the virtually deformed 3D measurement data of the virtually clamped object.

The requirement for this virtual simulation of the clamped condition is that the component is measured without tension. However, since the component is held in some way during the measurement, for example in a component holder, a measurement without tension is not easy to guarantee. Due to a static overdetermination of the component's receiving situation in the component holder, undefined tension states arise in the component, so that the return is always afflicted with an error resulting from the tensions.

SUMMARY

It is an object of the disclosure is to provide a method which makes it possible to obtain measurement data of an object, for example a non-inherently rigid component, in a state without tension or at least in a state with low tension and to create an improved device for receiving an object, for example a component holder device for receiving a component.

The object is achieved by device for receiving an object for three-dimensional measurement, a method for receiving an object in a device, a method for measuring an object, and a measuring system, as described herein.

To achieve the object, it is suggested to bear the object during the measurement in a device which is suitable to receive an object in a defined tension state and to prevent object movements during the measurement. The measurement data of the object can then be deformed virtually in such a way that a defined tension state, in particular a state without tension, can be simulated.

It is particularly advantageous if the entire tension state of the object during the measurement exhibits only tensions due to gravity.

With a device according to the disclosure for the receiving of an object, in the following also called component holder, a defined state of the object with as little tension as possible is made possible.

According to an aspect of the disclosure, the component holder is configured such that no additional tensions are added into the component by the component holder itself, such that the tensions present in the component result only from the weight force. In a computer-aided procedure, the tensions due to the weight force can then be determined deterministically and in a correction procedure, the 3D measurement data of the component can be simulated mathematically in a state without tension.

An object moving freely in a space has three degrees of translational freedom and three degrees of rotational freedom. The number of degrees of freedom can be limited by a restriction of the possibilities for movement, e.g., a bearing point of a component holder in which the object is received can limit a possible translation in one direction and thus reduce the number of degrees of freedom of the object. If the remaining number of degrees of freedom of the object is exactly equal to zero, the object can take exactly one position, there is a statically determined system. If the object in a component holder is restricted in more than its original degrees of freedom, it is a statically over-determined system in which strong internal tensions can occur.

In order to measure a component in a state without tension, a component holder is created that exactly limits the component in its degrees of freedom without being overdetermined. Thus, no tensions are added into the component by the component holder, only because of the weight force, for example at bearing points, can lead to an addition of tensions into the object. The tensions generated by the weight force can be determined by computer-aided methods and used in the course of virtual deformation of the component to simulate a state without tension of the component.

For example, the component holder can be configured to receive the component at one or more bearing points, whereby no two bearing points limit the same group of degrees of freedom. A bearing point can limit one or more degrees of freedom.

It is advantageous if less than six bearing points are used, for example if at least one bearing point restricts two different degrees of freedom. It is important that the entirety of the bearing points of the component holder exactly limits the existing degrees of freedom of the object, i.e., prevents object movements, for example during a measurement of the object, without causing tensions in the object due to an overdetermined restriction of the degrees of freedom. The simple touching of the object on a bearing point for support in gravitational direction therefore does not represent a restriction of a degree of freedom in the sense of the disclosure.

In a particularly advantageous configuration of the component holder, this contains three bearing points, each limiting two different degrees of freedom, so that the three bearing points limit all degrees of freedom of the object in the translational and rotational direction.

Possible exemplary embodiments for bearing points of a component holder are, for example, balls, rollers, linear bearings, elastic holders or friction holders. The bearing points can, for example, also be formed from a combination of the above exemplary embodiments.

It is particularly advantageous to form a component holder with three bearing points, whereby the bearing points are formed with the aid of roller supports. The roller supports, which are as similar as possible in design, are arranged in such a way that the rollers of the roller supports are not parallel to each other in order to avoid identical degrees of freedom being limited. The roller supports are also arranged in an exemplary embodiment such that no concentric arrangement of the rollers takes place, i.e., tangential circles applied to the rolling direction are not concentric.

In a further exemplary embodiment of the component holder, the component holder contains bearing points which are equipped with holding elements and elements for dispense of compressed air. The holding elements can be provided in various ways. The holding elements can be configured suction elements, for example suction cups, such that the component can be sucked in by negative pressure and a component held by compressed air can be brought into a so-called hovering position. The compressed air counteracts the weight force and is selected in that way that the component no longer rests on the suction elements, but not so strongly that the component flies away. When a component hovers on a suction element, an air cushion is created between the suction element and the object to be measured. The air cushion ensures that only reaction forces acting orthogonally to the object surface can be transmitted between the suction element and the object to be measured. Such a bearing point can be combined with other bearing points, e.g., by limiting the degrees of freedom of a component by combining it with a bivalent and a trivalent bearing point.

However, it is particularly advantageous if the component holder combines three bearing points with each other, which on the one hand bear the component and on the other hand can cause the component to hover by dispensing compressed air. It is particularly advantageous if the bearing points have suction elements which have a suction line and can bear the component by creating negative pressure. The suction and discharge lines can be formed out separately or combined.

In a first step, the component is placed and held on the bearing points as required in order to receive the component with low tension through the component holder. In the next step, one of the bearing points is detached and compressed air is dispensed through a correspondingly configured element of the bearing point. The element configured to dispense compressed air can be combined with the suction element in an advantageous way. By dispensing compressed air in the bearing point, the component detaches the connection to this bearing point and can thus relieve existing tensions. The compressed air is then switched off and the bearing point receive the component again, for example through the suction element. This process is carried out one after the other for further bearing points of the component holder, until the component is sufficiently relieved, and can then be received in the low tension state in the component holder and, for example, be subjected to a three-dimensional measurement.

Since it is the task of the component holder to receive components with low tension, the objects in the component holder are not clamped at clamping points, as it is known from other clamping devices. This allows the objects in the component holder to be easily moved, for example by accidentally touching the object, which can result in undefined positions during a measurement process. For better stability of the object alignment in the component holder, the bearing points can therefore be equipped with magnetic, electromagnetic, electrostatic or pneumatic features, have a microstructure surface or hold the component by negative pressure. It is important that only slippage is prevented. For example, the bearing points can be magnetic rollers or mounted suction elements.

According to a further exemplary embodiment of the component holder, the component holder has linear and/or rotational axes in order to simplify the positioning of the object relative to a measuring system with which the object is to be measured.

If the object is received without tension in a component holder, a measurement of the object, for example with a 3D scanner, provides measurement data of an object without tension. This data can then be used, for example, as a basis for a process for the virtual deformation of 3D measurement data in order to represent a specified tense condition of the object.

Even if a component is received by a component holder, which exactly limits its three degrees of translational freedom and its three degrees of rotational freedom, in reality it will not be completely without tension, but only tension relieved, because the tare weight of the object causes tensions in the object due to the effect of gravity, without additional clamping forces acting on defined clamping points. The weight force, i.e., the force on the object caused by the effect of the engraving field, causes a shift in the direction of the weight force at every point of the object. The amount of the applied weight force depends on the density of the material of which the object consists. The direction of the weight force depends on the direction of gravity.

Typically, the component holder is suitable for ensuring a bearing of the object in which no additional tensions are added into the object by the component holder, and the tensions resulting from the weight force can be determined by computer-aided methods. The known tensions of the object can then be used in a further process step, for example in the course of a virtual deformation of the measurement data of the component, in order to obtain measurement data of the component in a simulated state without tension.

For the method of computer-aided calculation of a state without tension of the object from measurement data of the object, for example the measurement data of a three-dimensional optical measurement according to a topometric measurement method, such as the principle of strip light projection, the position and orientation of the bearing points of the component holder in relation to the object is also required. The position and orientation of the bearing points has an influence on the local degrees of freedom restrictions used in the calculation of the object state without tension.

Typically, the bearing points are determined in a joint measurement process of the measurement of the object, for example the three-dimensional optical acquisition with a topometric measurement system.

This is particularly simplified by the use of an optical measuring system, if the bearing points can be determined by optically detectable features. For example, the optically detectable features can be measuring marks located near the bearing point. The position of the measuring marks in relation to the bearing point is determined by measuring the component holder, so that when measuring an object in the component holder it is sufficient to determine the position of the measuring mark in order to conclude on the position of the bearing point, which is usually optically covered by the object. Features that can be measured which are further away from the bearing point can also be used as long as the relative position and orientation of feature and bearing point have been determined by a measuring process.

BRIEF DESCRIPTION OF THE DRAWINGS

The disclosure will now be described with reference to the drawings wherein.

DESCRIPTION OF EXEMPLARY EMBODIMENTS

Figure 1:
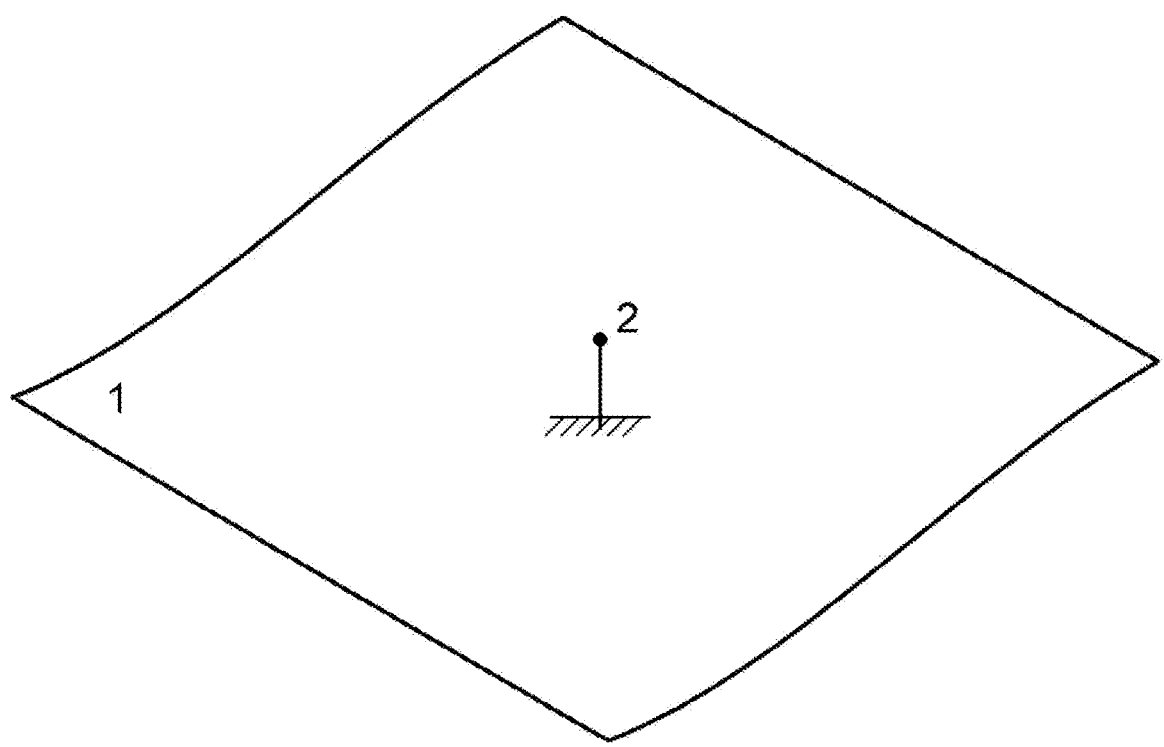
FIG. 1 shows a component on a bearing point which holds in all 6 degrees of freedom.

FIG. 1 shows a schematic representation of a component 1 held at a bearing point 2. The component holder, here only symbolically indicated, blocks in the bearing point 2 exactly the six possible degrees of freedom of the component. At bearing point 2, displacements in all three directions as well as rotations about all three axes of rotation are prevented. For example, a bearing point 2 can be realized by clamping.

Figure 2:
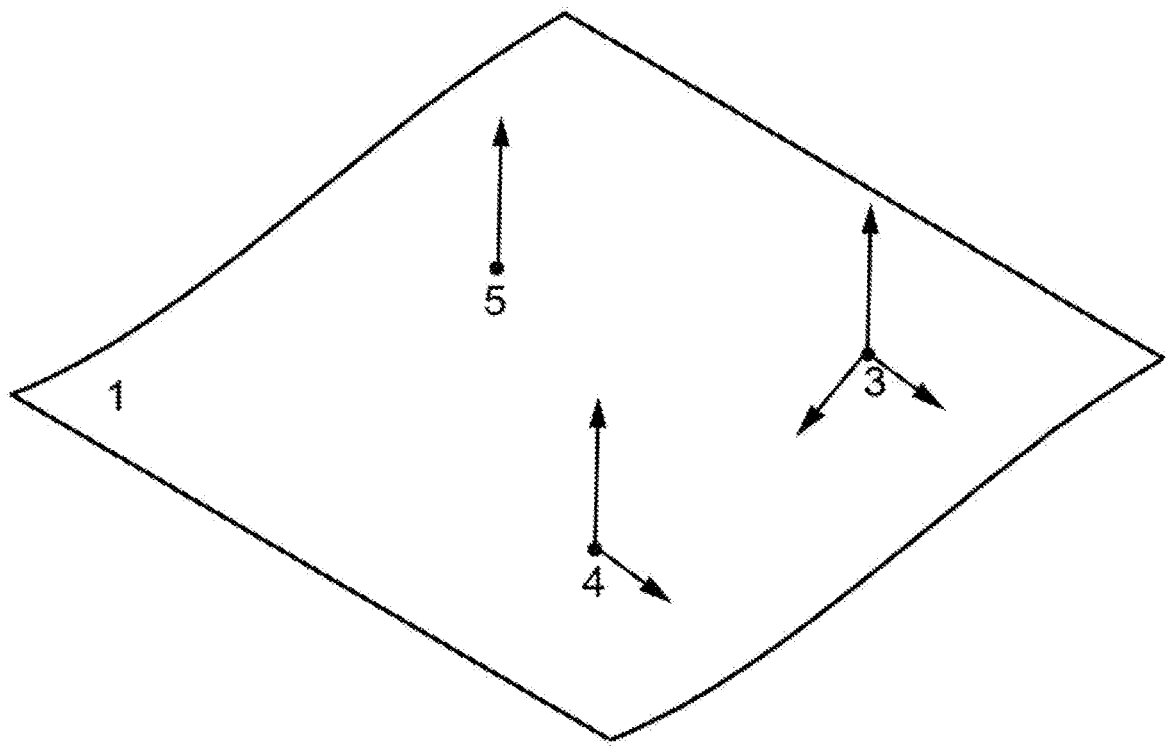
FIG. 2 shows a component on three bearing points as 3-2-1 clamping.

FIG. 2 symbolically shows a component 1, which is held in a component holder at three bearing points, whereby the bearing points 3, 4, and 5 each limit the component 1 in a different number of degrees of freedom. The movement limitations at the respective bearing points 3, 4, and 5 are symbolized by arrows.

Bearing point 3 limits component 1 in three degrees of freedom. For example, bearing point 3 is a rubberized bearing point. Component 1 is held at bearing point 3 in such a way that all displacements are prevented. However, component 1 can still rotate in all three space directions thanks to the remaining three degrees of rotational freedom. Due to the additional bearing of component 1 in bearing point 4, two further degrees of freedom are restricted. For example, bearing point 4 can be provided in the form of a roller support. Component 1 can only rotate around a rotation axis passing through bearing points 3 and 4. Bearing point 5 blocks the last remaining degree of freedom. An exemplary embodiment of such a bearing point 5 would be a stop or a ball bearing point.

Figure 3:
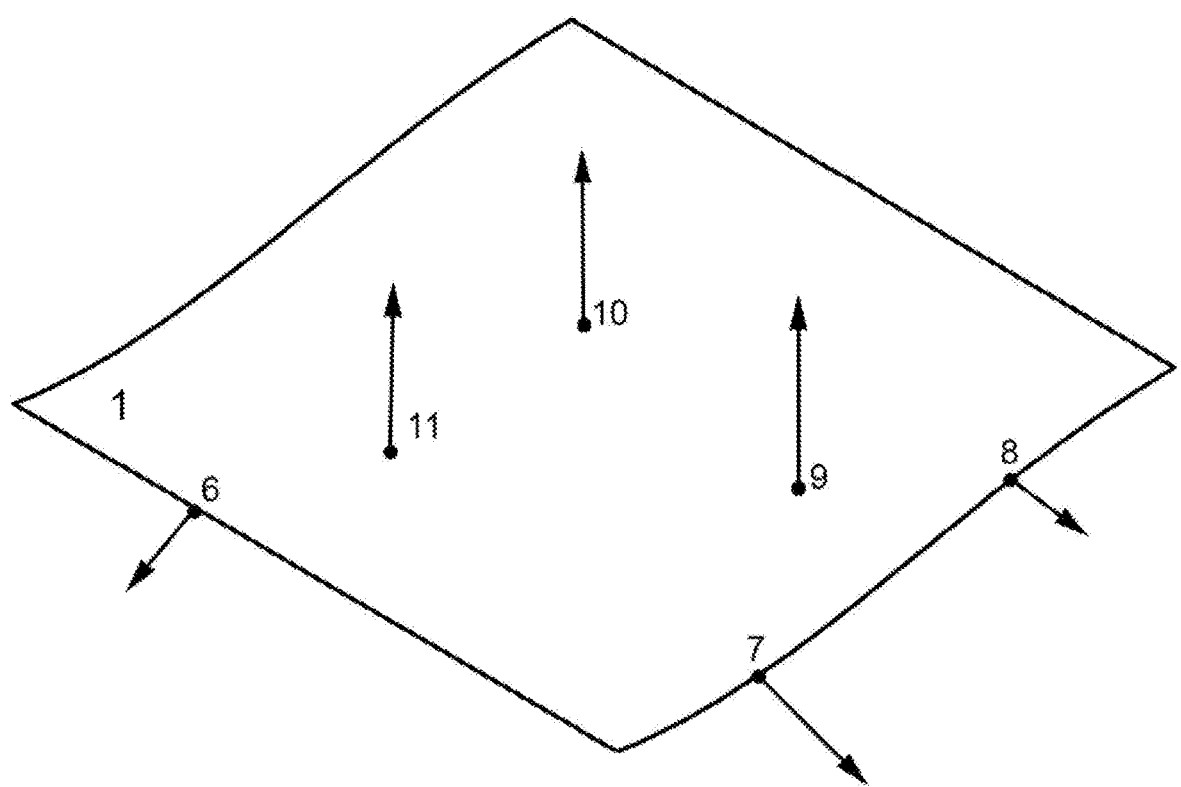
FIG. 3 shows a component on six bearing points.

FIG. 3 shows a schematic representation of a component 1, which is held at six bearing points 6, 7, 8, 9, 10, and 11 in a component holder. Each bearing point 6, 7, 8, 9, 10, and 11 is arranged in such a way that it suppresses a component movement in a direction symbolically represented by the arrows. Component 1 is limited in six degrees of freedom.

Figure 4:
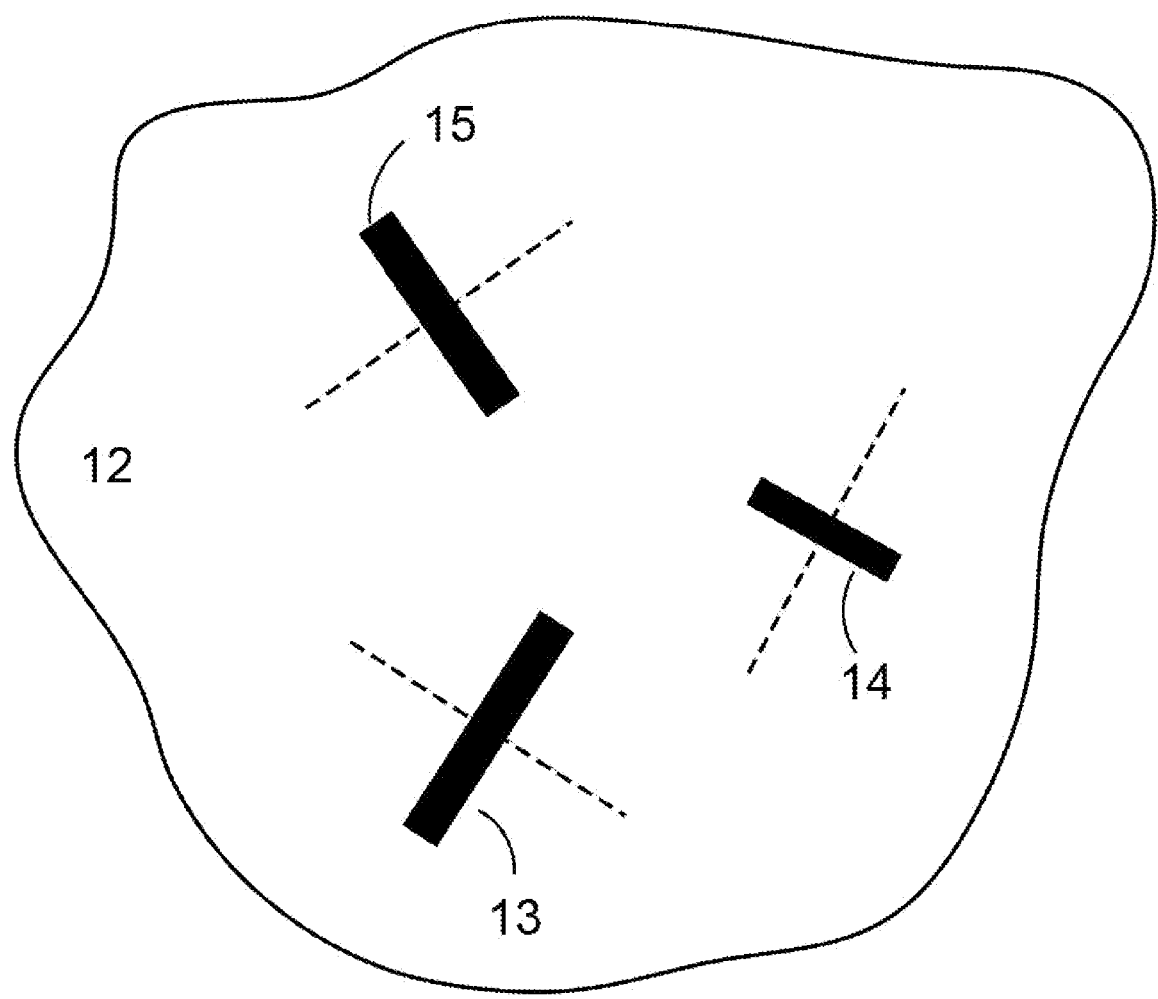
FIG. 4 shows a component on three bearing points as 2-2-2 clamping.

FIG. 4 shows a top view of a component 12 which is held in a component holder at three bearing points 13, 14, and 15. The bearing points 13, 14, and 15 in the schematic representation shown are arranged as differently sized rollers which can rotate around the dashed axes of rotation. Each of the bearing points 13, 14, and 15 restricts component 12 in two degrees of freedom.

Figure 5:
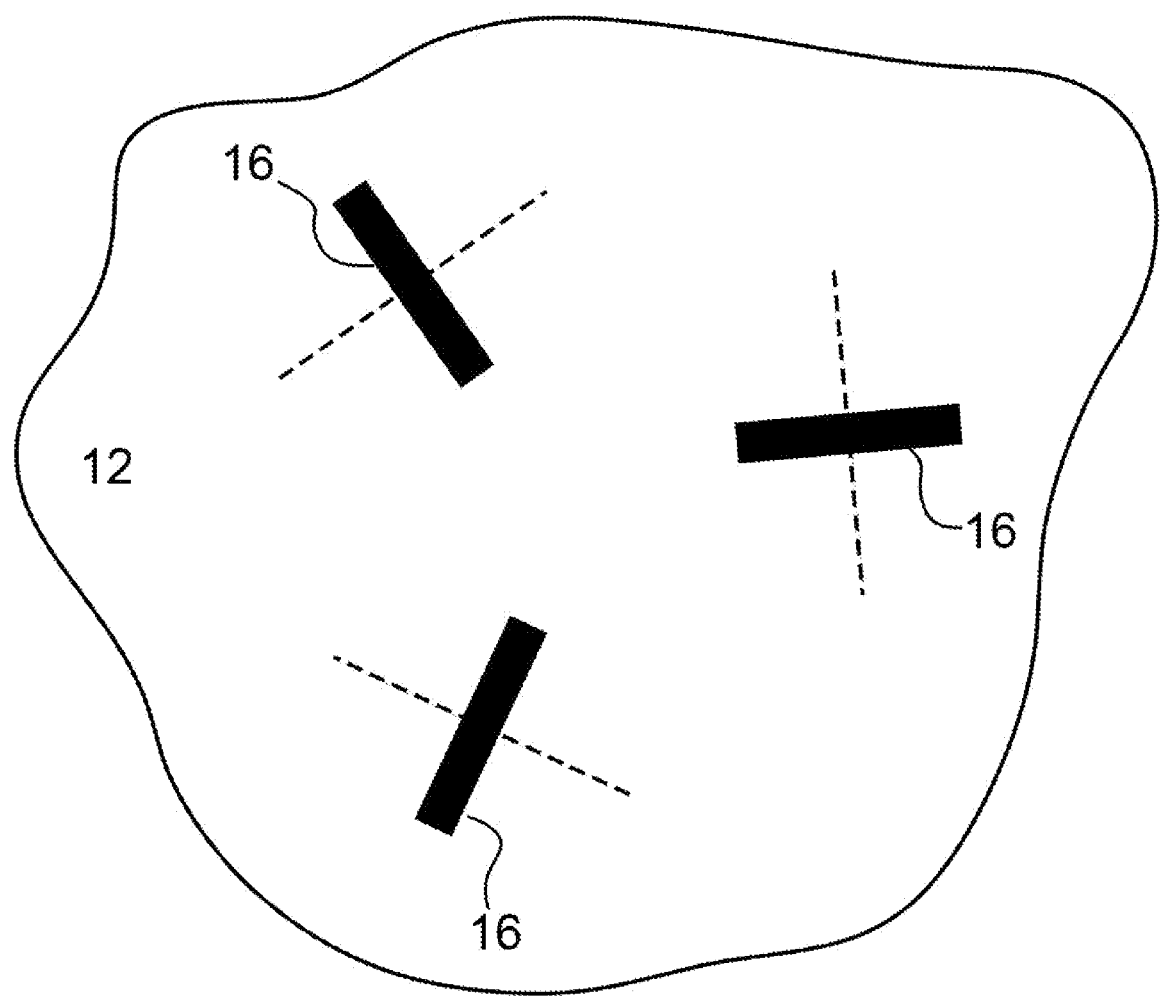
FIG. 5 shows a component on three bearing points as 2-2-2 clamping with a radial arrangement.

FIG. 5 shows a further exemplary embodiment of a component holder in a top view. The component holder has three bearing points 16 in the form of rollers, whereby the rollers 16 in the shown example have the same size and are arranged radially to each other. The component 12 is received by the three bearing points 16, whereby the bearing points 16, here in the form of rollers, each limit two degrees of freedom of the component 12.

Figure 6:
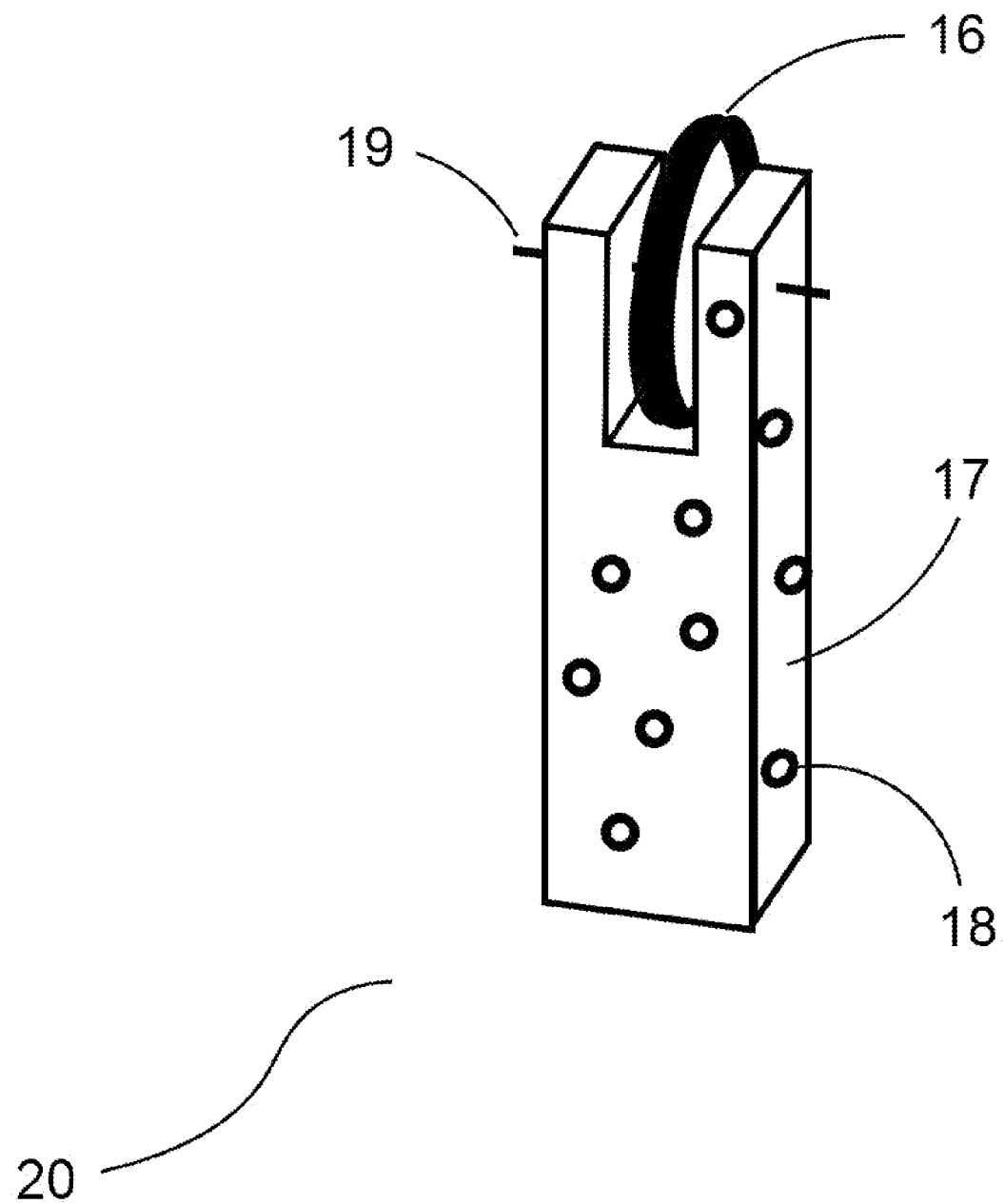
FIG. 6 shows a 3D view of a roller support with optically recordable features.

As shown in FIG. 6, the rollers 16 of the component holder are each held individually in a roller support 20 in a bearing holder 17 and are rotatable about an axis of rotation 19. It is particularly advantageous if each roller 16 is arranged in a separate roller support 20, whereby the individual rollers 16 of the component holder can easily be arranged in adapted positions depending on the size and shape of the component. The component holder shown as an example in FIG. 5 could then have three individual roller supports 20, which can be positioned variably relative to each other. If, for example, the component holder is intended to accommodate components of a similar shape over and over again, the individual roller supports 20 can also be firmly connected to each other, for example by a common bottom plate. The roller support 20 shown in FIG. 6 has reference features 18 in the form of reference marks on the bearing support 17. If the geometric data of the roller supports 20 including the rollers 16 and the reference features 18 are known, for example by optically measuring the roller supports 20, the rollers 16 and the reference features 18 in one measuring process, the position of the bearing point 16 can be inferred from a determination of the position of the reference features 18.

Figure 7:
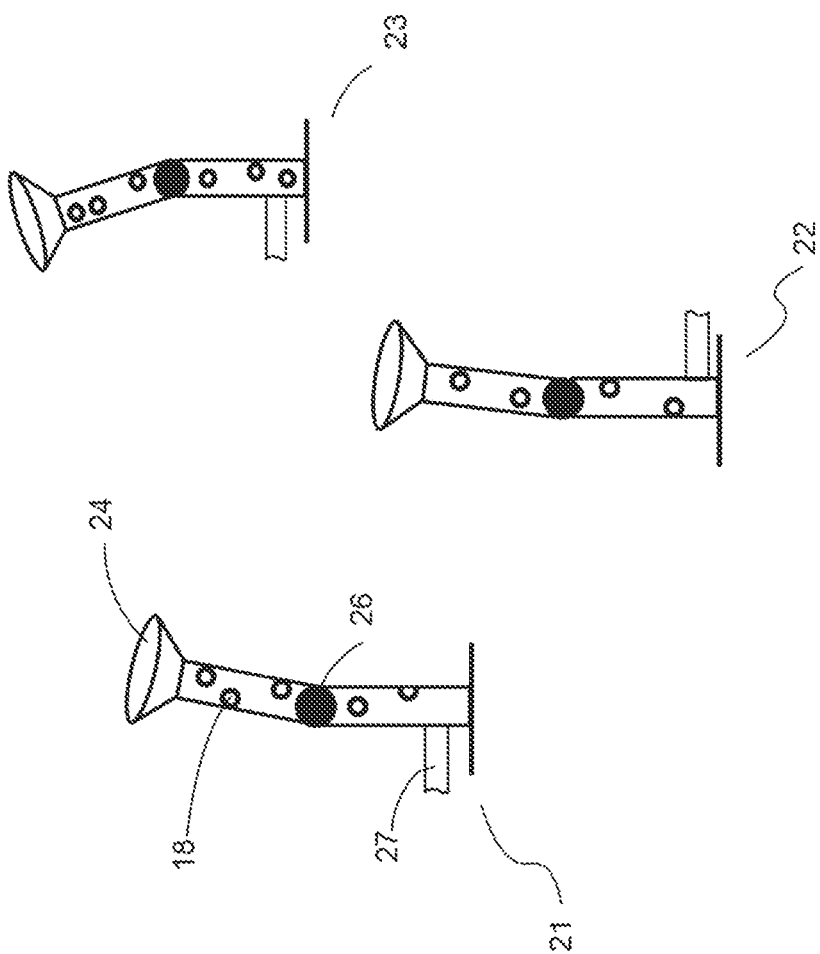
FIG. 7 shows a component holder with suction-pressure elements according to an exemplary embodiment of the disclosure.

FIG. 7 shows another exemplary embodiment of a component holder. In the exemplary embodiment shown, the component holder has three holding elements providing three bearing points 21, 22, and 23. These bearing points 21, 22, and 23 are equipped with suction elements 24. Via a suction line 27, a vacuum can be generated in the suction element 24 between the suction element 24 and the component. The suction line 27 is shown here only schematically as a supply to bearing point 21, 22, and 23 and can also continue further within bearing points 21, 22, and 23, for example up to the suction element 24. In addition, each bearing point 21, 22, and 23 has the possibility to dispense compressed air with the aid of a compressed air line 27. The compressed air strength can be regulated so that the component can hover during compressed air operation. The compressed air line 27 and the suction line 27 can be combined in the example shown and provided as internal lines. However, it is also possible to use separate lines, whereby these can be combined within the suction element 24, or the compressed air line 27 can also be located separately next to the suction element 24. The bearing points 21, 22, and 23 have reference features 18 in the form of reference marks. In the exemplary embodiment shown here, the bearing points 21, 22, and 23 also have joints 26, which make it possible to align the suction element 24 in a desired direction.

For measurement, the component is first placed arbitrarily on the suction elements 24 of the three bearing points 21, 22, and 23 and held in place with negative pressure. The vacuum is then switched off at a suction element 24, for example at bearing point 21, and compressed air is added instead. The component is brought into a hovered state above bearing point 21. By hovering the component on bearing point 21, any tension present at bearing points 22 and 23 can be balanced out. The component relieves. The compressed air is then switched off and a vacuum is generated again under the suction element 24 of bearing point 21. This process of alternating suction and hovering is then repeated for further bearing points, for example bearing point 22. This can be done for various bearing points 21, 22, and 23 until the component has reached a sufficiently relieved state. Then all suction elements 24 of the bearing points 21, 22, and 23 are activated and the measurement of the component can start. This holding state corresponds to a static determined bearing, since the suction elements 24 do not apply any additional forces other than those caused by gravity. It can be formulated as if the statically determined state (hovering on the suction cups) has been frozen.

Figure 8:
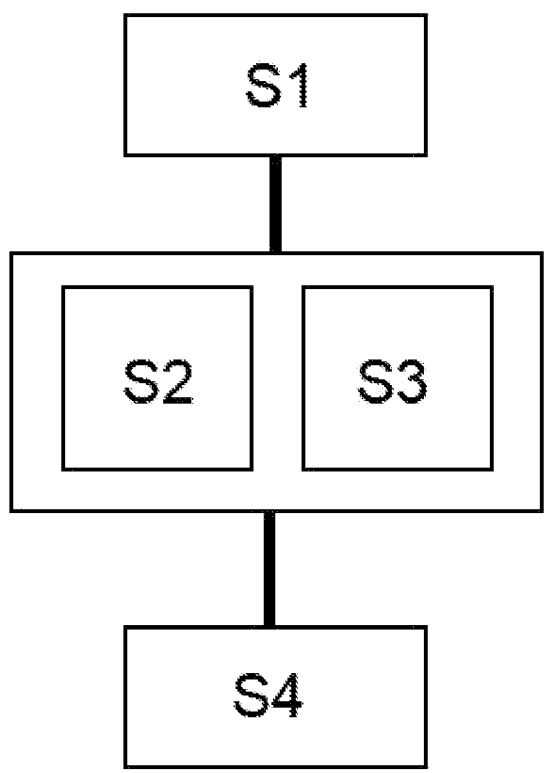
FIG. 8 shows a flow chart of a method for obtaining measurement data of an object in a state without tension according to an exemplary embodiment of the disclosure.

Next, with reference to FIG. 8, the sequence of a method for obtaining measurement data of an object in a state without tension is to be explained as an example.

First (step S1) the object, for example a component, is received in a component holder. The component holder has at least one bearing point and is suitable for receiving the object in a defined low tension state. The component holder receives the component with the aid of the bearing points in such a way that object movements within the component holder are prevented, but no tensions are added into the object by the component holder.

In step S2, the object is measured three-dimensionally. Ideally, a component 12 that is held in a component holder, for example according to the principle of FIG. 5, would be without tension. In reality, however, a weight force acts on component 12. In a computational procedure, the influence of the weight force on component 12 can be calculated out of the measurement data of component 12 using simulation methods in order to obtain virtual measurement data of the component in a tension-free state. For this it is necessary to know the points of attack of the weight force. These points of attack can be determined with the help of the position of the bearing points, which is determined in step S3.

The steps S2 "Measurement of the object" and S3 "Acquisition of the bearing points" can also be carried out in reverse order or in the same measurement process.

In order to determine the position of the bearing points 16 and the measurement data in relation to each other particularly easily, it is advantageous to determine the position of the bearing points 16 directly during the measurement of the component 12. In order to make this procedure particularly simple, reference features 18 are attached to the bearing holder 17, as shown in FIG. 6. The reference features 18 shown in FIG. 6 in the form of reference marks are exemplary, other designs are conceivable. For example, the reference features 18 can be attached to the bearing holders 17 in various ways or can also be specially designed parts of the bearing holder 17, and the reference features 18 can also contain codings. For example, once the geometry data of the roller receiving 20 including the reference features 18, have been determined in a measuring process, it is sufficient to determine the reference characteristics 18 of the roller support from the known measuring dimensions of the roller support 20 to infer the roller 16 when measuring a component 12. This also applies, for example, to the bearing points 21, 22, 23 shown in FIG. 7. Here, if the geometry of the bearing points 21, 22, 23 is known, the position of the suction elements 24 and thus the points of attack of the weight force can be determined by determining the reference features 18.

With the help of computer-aided methods in step S4, a model of component 1 and 12 can then be calculated in a state without tension from the data obtained. This model can then be used to make further evaluations of component 1 and 12, such as sizes or distance measurements, or it can also serve as a basis, for example, to simulate a specially tensioned state of component 1 and 12.

For example, a state without tension of the object can be calculated from the measurement data, the positions and orientations of the bearing points, as well as a model of the component that is suitable for calculation, whereby the bearing points are recognized from the measurement data and corresponding local degrees of freedom limitations of the component are provided in a model.

It is understood that the foregoing description is that of the exemplary embodiments of the disclosure and that various changes and modifications may be made thereto without departing from the spirit and scope of the disclosure as defined in the appended claims.

What is claimed is:

1. A device for receiving an object for three-dimensional measurement, the device comprising:
   a plurality of holding elements providing bearing points for bearing the object, the plurality of bearing points including an element configured to dispense compressed air for providing an air cushion between the object and the bearing point;
   said device being configured to hold the object by the holding elements without additional tension added into the object by the holding elements by
   (a) detaching at least one selected holding element from the object at at least one of the bearing points by dispensing the compressed air at the at least one bearing point;

(b) switching off the compressed air at the at least one bearing point and bearing the object by the at least one selected holding element at the respective at least one bearing point;
(c) repeating steps (b) and (c) for further holding elements, said further holding elements being formed to bear the object at a respective bearing point and configured to dispense the compressed air, so as to hold the object by the holding elements without additional tension added into the object by the holding elements.

2. The device according to claim 1, wherein the holding element comprises a suction element.

3. The device according to claim 1, wherein the holding element and the element for dispensing the compressed air are two separate elements.

4. The device according to claim 1, wherein the element for dispensing the compressed air is formed in combination with the holding element as one element.

5. The device according to claim 1, wherein the device has one or more linear and rotation axes for a total displacement of the device.

6. A method for receiving an object in a device, the method comprising the steps of:
(a) receiving the object in the device, said device having at least one holding element each providing a bearing point formed to bear the object by a holding element, wherein said holding element comprises an element to dispense compressed air for providing an air cushion between the object and the bearing point;
(b) detaching at least one selected holding element from the object at at least one of the bearing points by dispensing the compressed air at the at least one bearing point;
(c) switching off the compressed air at the at least one bearing point and bearing the object by the at least one selected holding element at the respective at least one bearing point;
(d) repeating steps (b) and (c) for further holding elements, said further holding elements being formed to bear the object at a respective bearing point and configured to dispense the compressed air, so as to hold the object by the holding elements without additional tension added into the object by the holding elements.

7. A method for measuring an object by receiving the object in a device for receiving the object and three-dimensionally measuring the object, wherein the receiving of the object in the device for receiving the object includes the steps of:
(a) receiving the object in the device, said device having at least one holding element each providing a bearing point formed to bear the object by a holding element, said holding element comprising an element configured to dispense compressed air;
(b) detaching at least one selected holding element from the object at the at least one of the bearing points by dispensing the compressed air at the at least one bearing point;
(c) switching off the compressed air at the at least one bearing point and bearing the object by the at least one selected holding element at the respective at least one bearing point to bear the object by the holding element;
(d) repeating steps (b) and (c) for further holding elements, said further holding elements being formed to bear the object at a respective bearing point and configured to dispense the compressed air, so as to hold the object by the holding elements without additional tension added into the object by the holding elements.

* * * * *